(12) United States Patent
Nakamura

(10) Patent No.: US 12,548,269 B2
(45) Date of Patent: Feb. 10, 2026

(54) INFORMATION PROCESSING APPARATUS AND INFORMATION PROCESSING METHOD

(71) Applicant: CANON KABUSHIKI KAISHA, Tokyo (JP)

(72) Inventor: Naohito Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 18/483,548

(22) Filed: Oct. 10, 2023

(65) Prior Publication Data

US 2024/0135660 A1 Apr. 25, 2024
US 2024/0233289 A9 Jul. 11, 2024

(30) Foreign Application Priority Data

Oct. 20, 2022 (JP) .................................. 2022-168587

(51) Int. Cl.
*G06T 19/00* (2011.01)
*G06T 3/40* (2006.01)
*G06V 10/25* (2022.01)

(52) U.S. Cl.
CPC .............. *G06T 19/006* (2013.01); *G06T 3/40* (2013.01); *G06V 10/25* (2022.01)

(58) Field of Classification Search
CPC .......... G06T 19/006; G06T 3/40; G06V 10/25
USPC ....................................................... 345/633
See application file for complete search history.

(56) References Cited

U.S. PATENT DOCUMENTS

| 8,558,759 | B1* | 10/2013 | Prada Gomez | ......... G06F 3/017 345/619 |
| 10,948,993 | B2 | 3/2021 | Alexandros | |
| 2012/0139907 | A1* | 6/2012 | Lee | ....... G06F 3/0304 345/419 |
| 2013/0321261 | A1* | 12/2013 | Nakasu | ................. G06F 3/0304 345/156 |
| 2015/0138075 | A1* | 5/2015 | Nakasu | .................... G06F 3/017 345/156 |
| 2018/0210627 | A1* | 7/2018 | Woo | ........................ G06F 3/012 |
| 2019/0025909 | A1* | 1/2019 | Mittal | ...................... G06F 3/011 |
| 2019/0122420 | A1* | 4/2019 | Terahata | .................. G06T 19/20 |
| 2019/0369741 | A1* | 12/2019 | Chen | ........................ G06T 7/60 |
| 2019/0377416 | A1* | 12/2019 | Alexander | .......... G06F 3/04815 |

(Continued)

FOREIGN PATENT DOCUMENTS

| JP | 2015100032 A | 5/2015 | |
| JP | 2017-27206 | * 7/2015 | ............. G06F 3/048 |
| JP | 2021197024 A | 12/2021 | |

*Primary Examiner* — Jin Ge

(74) *Attorney, Agent, or Firm* — Carter, DeLuca & Farrell LLP

(57) ABSTRACT

An information processing apparatus includes at least one memory and at least one processor which function as: a display control unit configured to perform display control of a virtual object such that the virtual object is placed in a three-dimensional space that serves as a field of view of a user; a setting unit configured to set a selection range in the three-dimensional space based on a plurality of positions differently distanced from the user, the plurality of positions being designated by using an operation body located at a position of a hand of the user; and a selection unit configured to switch a state of the virtual object between a selected state and a deselected state based on the selection range.

22 Claims, 8 Drawing Sheets

(56) References Cited

U.S. PATENT DOCUMENTS

| | | | |
|---|---|---|---|
| 2021/0209860 A1* | 7/2021 | Ravasz | G06F 3/04842 |
| 2022/0137701 A1* | 5/2022 | Bowman | G06F 3/013 |
| | | | 345/156 |
| 2022/0137705 A1* | 5/2022 | Hashimoto | G06F 3/0304 |
| | | | 345/156 |
| 2023/0241945 A1* | 8/2023 | Athanasakopoulos | ............ |
| | | | B60H 1/3222 |
| | | | 62/323.4 |
| 2023/0245406 A1* | 8/2023 | Powderly | G06F 3/013 |
| | | | 345/633 |
| 2023/0368483 A1 | 11/2023 | Nakamura | |
| 2024/0152245 A1* | 5/2024 | Broughton | G06F 3/013 |

* cited by examiner

INFORMATION PROCESSING APPARATUS AND INFORMATION PROCESSING METHOD

BACKGROUND OF THE INVENTION

Field of the Invention

The present invention relates to an information processing apparatus and an information processing method.

Description of the Related Art

In recent years, virtual reality (VR) systems, mixed reality (MR) systems, and the like have been developed for the purpose of seamlessly combining a real space and a virtual space. These systems are used in a head-mounted display (HMD), which is an eyeglass-type device including a small display.

As a user interface (UI) used when an HMD is worn, there has been proposed a method in which movement of a hand of a user is recognized to be used for an operation. For example, Japanese Patent Application Publication No. 2015-100032 describes a method for placing video content on an extension of an area surrounded by fingers of the user.

In addition, Japanese Patent Application Publication No. 2021-197024 describes a method for changing an object in a selected state from a plurality of overlapping objects when a predetermined action is received from a user interface.

However, the operation for selecting a desired object from a plurality of overlapping objects (virtual objects) may be complicated.

SUMMARY OF THE INVENTION

The present invention provides an information processing apparatus that enables a user to easily select a desired object from a plurality of virtual objects that are overlappingly placed in a depth direction in a three-dimensional space.

An information processing apparatus according to the present invention includes at least one memory and at least one processor which function as: a display control unit configured to perform display control of a virtual object such that the virtual object is placed in a three-dimensional space that serves as a field of view of a user; a setting unit configured to set a selection range in the three-dimensional space based on a plurality of positions differently distanced from the user, the plurality of positions being designated by using an operation body located at a position of a hand of the user; and a selection unit configured to switch a state of the virtual object between a selected state and a deselected state based on the selection range.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. Note that the embodiments described below are examples as implementation means and can be appropriately changed depending on the configuration and various conditions of an apparatus to which the present invention is applied, and the present invention is not limited to the following embodiments. In addition, it is also possible to appropriately combine some of the following embodiments and modifications without departing from the scope of the invention.

Embodiment 1

Figure 1:
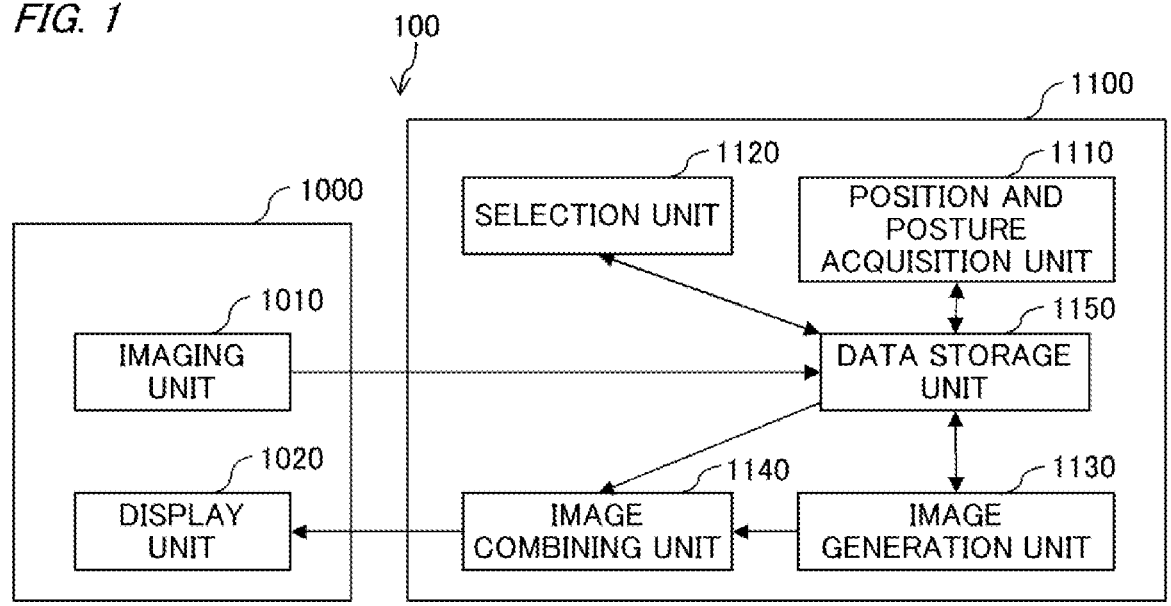
FIG. 1 is a block diagram illustrating a functional configuration example of an image processing system.

FIG. 1 is a block diagram illustrating a functional configuration example of an image processing system 100 according to the present embodiment. The image processing system 100 is, for example, a system for presenting, to a person experiencing the system, a mixed reality space (MR space) in which a real space and a virtual space are merged. The image processing system 100 performs display control such that a virtual object is placed in a three-dimensional space, which is a field of view of the user. The user can select a desired virtual object by designating (selecting) a selection range in the three-dimensional space.

The present embodiment will be described, assuming a case in which an MR space is presented to a user by displaying a combined image obtained by combining an image of a real space and an image of a virtual space rendered by computer graphics (CG).

The image processing system 100 includes a display device 1000 and an information processing apparatus 1100. The information processing apparatus 1100 can combine an image of a real space obtained from the display device 1000 with an image of a virtual space generated by the information processing apparatus 1100 and output the combined image to the display device 1000 as a mixed reality image (MR image).

Note that the image processing system 100 relates to a system that displays an image of a virtual space and is not limited to the mixed reality (MR) system that displays an MR image obtained by combining an image of a real space and an image of a virtual space. The image processing system 100 can be applied to a virtual reality (VR) system that presents only an image of a virtual space to a user or an augmented reality (AR) system that presents an image of a virtual space to a user through a real space.

The display device 1000 includes an imaging unit 1010. The imaging unit 1010 continuously captures images of a real space in a time series and outputs the captured images of the real space to the information processing apparatus 1100. The imaging unit 1010 may include a stereo camera composed of two cameras fixed to each other so as to be able to capture the real space in a line-of-sight direction from the position of a viewpoint of the user.

The display device 1000 includes a display unit 1020. The display unit 1020 displays an MR image output from the information processing apparatus 1100. The display unit 1020 may include two displays arranged to correspond to the right and left eyes of the user. In this case, the left-eye display corresponding to the left eye of the user displays a left-eye MR image, and the right-eye display corresponding to the right eye of the user displays a right-eye MR image.

The display device 1000 is, for example, a head-mounted display device (HMD) mounted on the head of the user. However, the display device 1000 is not limited to the HMD and may be a hand-held display (HHD). The HHD is a display held by the hands, and as with binoculars, the user holds the HDD by the hands and looks into the HDD to observe an image. Furthermore, the display device 1000 may be a display terminal such as a tablet or a smartphone.

The information processing apparatus 1100 and the display device 1000 are connected so as to be able to perform data communication with each other. The information processing apparatus 1100 and the display device 1000 may be connected to each other with a wire or wirelessly. The information processing apparatus 1100 may be provided in the housing of the display device 1000.

The information processing apparatus 1100 includes a position and posture acquisition unit 1110, a selection unit 1120, an image generation unit 1130, an image combining unit 1140, and a data storage unit 1150.

The position and posture acquisition unit 1110 acquires the position and posture of the imaging unit 1010 in the world coordinate system and the positions of the hands of an observer (user). Specifically, the position and posture acquisition unit 1110 extracts a marker assigned to the world coordinate system from an image of a real space captured by the imaging unit 1010. The position and posture acquisition unit 1110 acquires the position and posture of the imaging unit 1010 in the world coordinate system based on the position and posture of the marker and outputs the acquired position and posture information on the imaging unit 1010 to the data storage unit 1150.

The position and posture acquisition unit 1110 extracts a feature area of the hand from the image of the real space captured by the imaging unit 1010. The position and posture acquisition unit 1110 acquires position information on each part of the hand by using the extracted feature area of the hand and shape information on the hand stored in the data storage unit 1150. The position information on each part of the hand may be position information of a part of the hand such as a fingertip or a joint of each finger. The position and posture acquisition unit 1110 may acquire the position information on the part used by the selection unit 1120 to set a selection range. For example, in a case where the user specifies the selection range with a fingertip, the position and posture acquisition unit 1110 may acquire the position information of the fingertip.

Note that the method for acquiring the position and posture of the imaging unit 1010 is not limited to the above method. For example, the position and posture acquisition unit 1110 may perform simultaneous localization and mapping (SLAM) processing based on a feature point appearing in an image. The position and posture acquisition unit 1110 can obtain the position and posture of the imaging unit 1010 and the position and posture in the individual coordinate system by SLAM processing.

The position and posture of the imaging unit 1010 may be obtained by attaching, to the display device 1000, a sensor whose relative position and posture with respect to the imaging unit 1010 is known and using a measurement value obtained by the sensor. The position and posture acquisition unit 1110 can obtain the position and posture of the imaging unit 1010 in the world coordinate system by converting the measurement value obtained by the sensor based on the relative position and posture of the sensor with respect to the imaging unit 1010. The position and posture acquisition unit 1110 may obtain the position and posture of the imaging unit 1010 by using a motion capture system.

The method for acquiring the positions of the hands of the user is not limited to the above method. For example, in a case where the imaging unit 1010 is a monocular camera, the position and posture acquisition unit 1110 can acquire the positions of the hands by a time of flight (ToF) sensor. In a case where the imaging unit 1010 includes a plurality of cameras having different positions and postures, the position and posture acquisition unit 1110 may acquire the positions of the hands based on images captured by the plurality of cameras. For example, the position and posture acquisition unit 1110 can use a method such as semi-global matching (SGM) to obtain the depth of the entire image from the stereo images and obtain the positions of the hands by using the depth information and the shape information on the hands.

The position and posture acquisition unit 1110 may acquire the positions of the hands by using gloves worn by the user, the gloves each including a sensor capable of acquiring the position of each joint of the hand. The position and posture acquisition unit 1110 may acquire the positions of the hands by using a motion capture system. In a case where the user performs an operation by using an MR controller at the position of the hand, the position and posture acquisition unit 1110 may acquire the position of the controller as the position of the hand.

The selection unit 1120 sets a selection range in a virtual space based on the positions of the hands of the user acquired by the position and posture acquisition unit 1110. The selection unit 1120 changes the selected state of virtual space data (a virtual object) included in the selection range.

The image generation unit 1130 constructs a virtual space based on the data of the virtual space stored in the data storage unit 1150. The virtual space data includes data related to each virtual object constituting the virtual space, data related to an approximate real object obtained by incorporating three-dimensional shape information on a real object acquired from a real space into the virtual space, and data related to a light source for illuminating the virtual space.

The image generation unit 1130 sets a virtual viewpoint based on the position and posture of the imaging unit 1010 acquired by the position and posture acquisition unit 1110. The image generation unit 1130 can set, for example, the position of the dominant eye of the user or the midpoint between the right and left eyes as the virtual viewpoint. The dominant eye of the user can be set in advance. In a case where the imaging unit 1010 includes a plurality of cameras, the image generation unit 1130 can set the virtual viewpoint based on the positional relationship among the positions of the respective cameras at the time that the user is wearing the HMD (display device 1000) and the positions of the eyes of the user.

The image generation unit 1130 generates an image of a virtual space (virtual space image) viewed from the set viewpoint. Since a technique for generating a virtual space image viewed from the viewpoint having a predetermined position and posture is well known, detailed description thereof will be omitted.

The image combining unit 1140 combines the virtual space image generated by the image generation unit 1130 and the real space image captured by the imaging unit 1010 to generate an MR image, which is an image of a three-dimensional space. The image combining unit 1140 outputs the generated MR image to the display unit 1020.

The data storage unit 1150 includes a RAM, a hard disk drive, and the like and stores the various kinds of information described above. The data storage unit 1150 stores information described as known information and various setting information.

Figure 2:
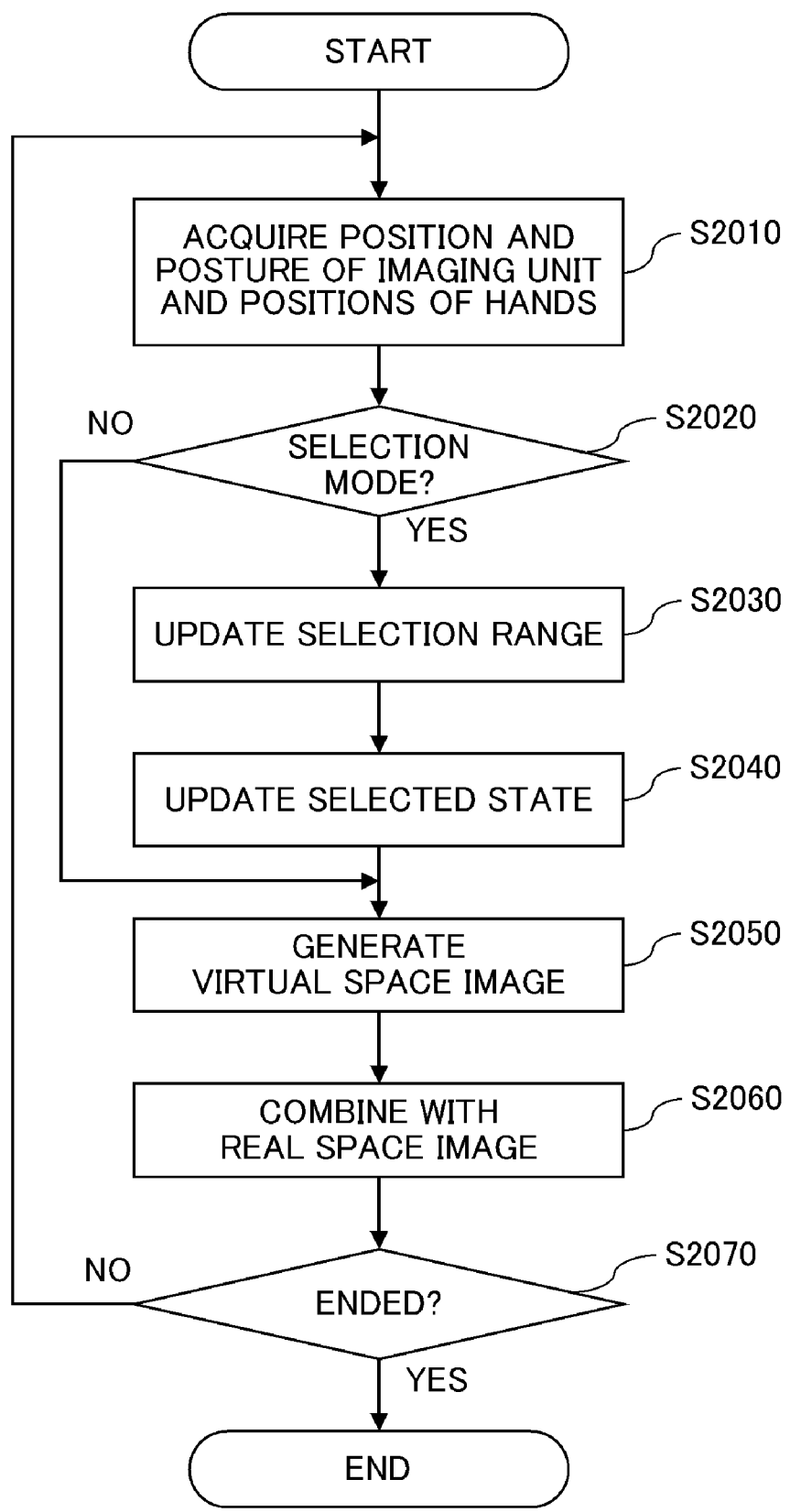
FIG. 2 is a flowchart illustrating processing performed by an information processing apparatus according to Embodiment 1.

FIG. 2 is a flowchart illustrating an example of processing in which the information processing apparatus 1100 generates an MR image and outputs the MR image to the display device 1000.

In step S2010, the position and posture acquisition unit 1110 acquires the position and posture of the imaging unit 1010 and the positions of the hands of the user. The positions of the hands of the user include information such as a position of each part (for example, a fingertip, a joint, or the like) of the hand and a position of a controller mounted on or held by the hand. The position and posture acquisition unit 1110 may acquire information used for setting a selection range among these pieces of information.

In step S2020, the selection unit 1120 determines whether the current mode is a mode (selection mode) for selecting a virtual object. A method for determining whether the mode is shifted to the selection mode will be described with reference to FIGS. 3A to 3E. If it is determined that the current mode is the selection mode, the processing proceeds to step S2030. If it is determined that the current mode is not the selection mode, the processing proceeds to step S2050.

In step S2030, the selection unit 1120 updates the selection range for changing the selected state of the virtual object to be placed and displayed in the virtual space based on the positions of the hands of the user. The selection range is a range in the three-dimensional space that is designated by using an operation body at the position of each hand of the user. The operation body may be a hand/hands of a user or may be one or more controllers. Hereinafter, the operation body will be described as the hand of the user.

In step S2040, the selection unit 1120 updates the selected state of the virtual object included in the selection range based on the updated selection range. The selection unit 1120 switches the state of the virtual object included in the selection range to the selected state and switches the state of the virtual object not included in the selection range to a deselected state. The virtual object included in the selection range may be a virtual object that is entirely included in the selection range or may be a virtual object that is partially included (at a predetermined ratio or more) in the selection range. The virtual object included in the selection range may be a virtual object whose center of gravity is included in the selection range.

In step S2050, the image generation unit 1130 generates a virtual space image viewed from a virtual viewpoint by using the information on the position and posture of the imaging unit 1010 acquired in step S2010.

In step S2060, the image combining unit 1140 combines the virtual space image generated in step S2050 with an image of the real space (real space image) captured by the imaging unit 1010 to generate an MR image.

In step S2070, the information processing apparatus 1100 determines whether an end condition is satisfied. The information processing apparatus 1100 can determine that the end condition is satisfied when, for example, an instruction to end the processing for generating the MR image is input. If the information processing apparatus 1100 determines that the end condition is satisfied, the processing illustrated in FIG. 2 ends. If the information processing apparatus 1100 determines that the end condition is not satisfied, the processing returns to step S2010.

FIGS. 3A to 3E illustrate examples of operations for selecting a virtual object according to Embodiment 1. FIGS. 3A to 3E illustrate examples of combined images (MR images) generated by the image combining unit 1140. In addition, FIGS. 3A to 3E illustrate an example in which the selection unit 1120 sets a selection range in the virtual space and changes the selected state of the virtual object.

A real space image 3010 is an image representing a real space and is an image captured by the imaging unit 1010. The real space image 3010 is combined with a virtual space image in which various objects are placed.

Objects representing a left hand 3020 and a right hand 3030 of the user are placed in a combined image obtained by combining the real space image 3010 and the virtual space image. Objects representing virtual objects 3040, 3050, 3060, and 3070 are placed in the combined image. Coordinate axes 3080 indicate a coordinate system in the virtual space. The X-axis direction corresponds to the horizontal direction of an MR image displayed on the display. The Y-axis direction corresponds to the vertical direction of the MR image displayed on the display. The Z-axis direction corresponds to the depth direction of the virtual space.

Figure 3A:
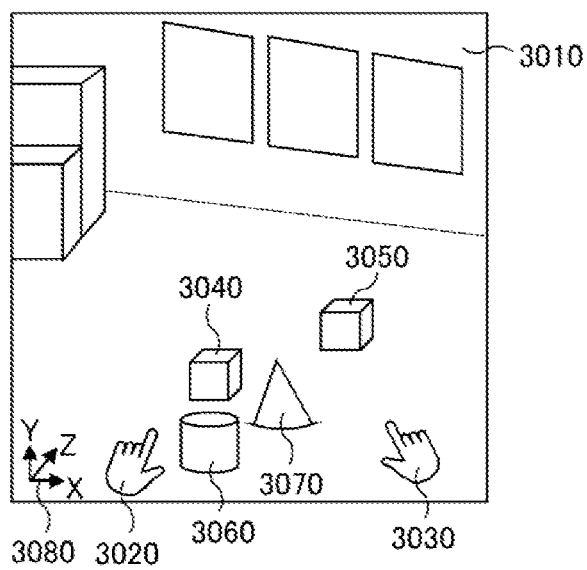
FIGS. 3A to 3E illustrate examples of operations for selecting a virtual object according to Embodiment 1.

FIG. 3A illustrates a state in which there is no change in the selected state of the virtual objects in the virtual space. The image generation unit 1130 generates a virtual space image based on the position and posture of the imaging unit 1010 acquired by the position and posture acquisition unit 1110. The image combining unit 1140 combines the virtual space image and a real space image captured by the imaging unit 1010 to generate an MR image (combined image).

Figure 3B:
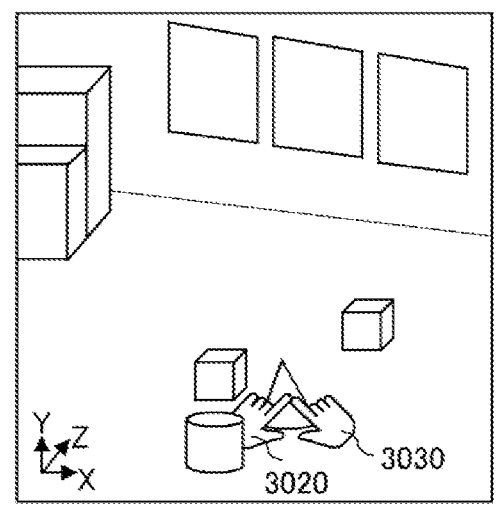

FIG. 3B illustrates a state in which the selection mode for changing the selected state of the virtual object starts. In the example of FIG. 3B, the selection mode starts when a distance between the left hand 3020 and the right hand 3030 of the user becomes equal to or less than a predetermined value.

The position and posture acquisition unit 1110 acquires positions of the left hand 3020 and the right hand 3030 of the user. In the example in FIG. 3B, the position and posture acquisition unit 1110 may acquire the respective positions of the fingertips of the right and left forefingers as the positions of the hands. The selection unit 1120 sets a selection range based on the information on the positions of the hands and changes the selected state of the virtual object included in the selection range.

The selection mode may be started under condition that the amount of movement of the hands detected for a predetermined time is equal to or less than a threshold or that a distance between the left hand and the right hand is equal to or less than a threshold for a predetermined time. In addition, the selection mode may be started when the user changes the shape of the hand to a predetermined shape. The selection mode may be started in accordance with a user operation from an input device such as a button. Further, the selection mode may be started in accordance with an instruction given by the line of sight or voice of the user.

Figure 3C:
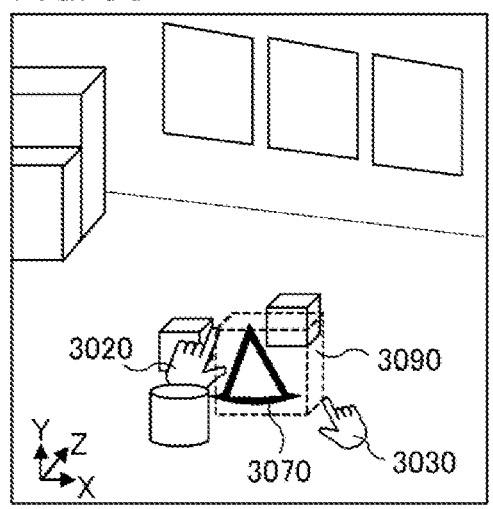

FIG. 3C illustrates a state in which a selection range 3090 is set after the left hand 3020 and the right hand 3030 of the user have moved from the state in FIG. 3B so as to surround the virtual object. In the example of FIG. 3C, the left hand 3020 has moved to the near side and the right hand 3030 has moved to the far side such that their respective positions are differently distanced from the user. The selection unit 1120 sets the selection range 3090 by using the position of the fingertip of the forefinger of the left hand 3020 and the position of the fingertip of the forefinger of the right hand 3030 on a diagonal line and by using triaxial information about the coordinate axes 3080. The set selection range 3090 may be indicated by a dotted line as illustrated in FIG. 3C.

It is preferable that the selection range 3090 have a frustum shape having its top face facing the user side. For example, by setting the position of an eye (viewpoint) of the user is set as a reference position, the frustum shape extends from the reference position in a direction in which the virtual object is placed, passing through the plurality of positions designated by the hands of the user (the positions of the hands of the user specifying the selection range). As the selection range 3090 expands more toward the far side, the misalignment between the set selection range 3090 and the visible range of the user is reduced. The position of the eye of the user may be the position of the dominant eye of the user.

Since the virtual object 3070 is included in the selection range 3090, the selection unit 1120 changes the state of the virtual object 3070 to the selected state. The virtual object 3070 in the selected state may be displayed in an emphasized manner. For example, the virtual object 3070 may be outlined in a thicker line than the other virtual objects or may be highlighted. As long as the virtual object in the selected state and the virtual object in the non-selected state (deselected state) are displayed in different display modes, any display method, such as a wire frame display or a display in different colors or transparency, may be used.

Whether or not the virtual object is included in the selection range is determined not only by determining whether the virtual object is partially (at a predetermined ratio or more) included in the selection range. Whether or not the virtual object is included in the selection range may be determined based on whether the virtual object is entirely included (whether each vertex of a cuboid circumscribing the virtual object is included) in the selection range or whether the center of gravity of the virtual object is included in the selection range.

Figure 3D:
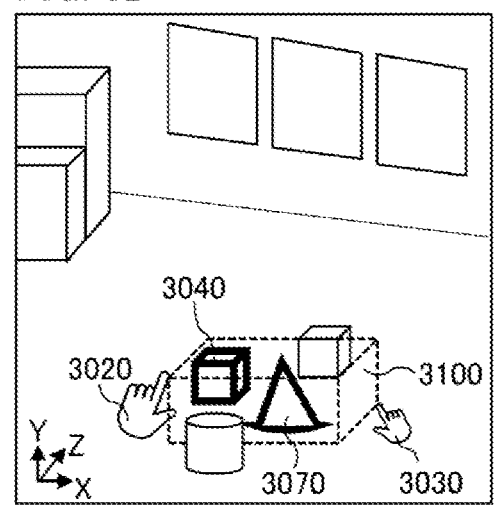

FIG. 3D illustrates a state in which the left hand 3020 and the right hand 3030 of the user have further moved in the X-axis direction and the Z-axis direction, respectively, from the state in FIG. 3C. A selection range 3100 in the state in FIG. 3D is larger than the selection range 3090 in FIG. 3C and includes the virtual object 3070 and the virtual object 3040. The selection unit 1120 also changes the state of the virtual object 3040 to the selected state, in addition to the virtual object 3070.

Figure 3E:
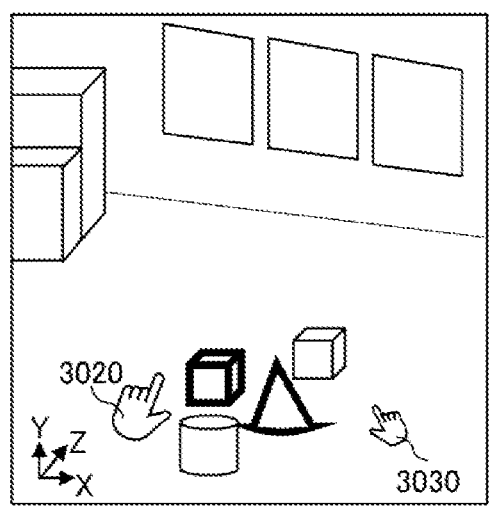

FIG. 3E illustrates a state in which the amount of movement of the left hand 3020 and the right hand 3030 of the user from the state of the FIG. 3D has become equal to or less than a threshold, the movement being detected for a predetermined time. When the selection range 3100 is set and the selected states of the virtual objects are updated, the selection mode is ended. When the selection mode is ended, the selection range 3100 that has been indicated by the dotted line may be hidden.

As described above, the selection mode ends under condition that the movement of the hands detected for a predetermined time is equal to or less than the threshold. However, the condition is not limited thereto. The selection mode may be ended when the user changes the shape of the hand, for example, the fingertip is bent. The selection mode may be ended in accordance with a user operation from an input device such as a button or an instruction given by the line of sight or voice of the user.

In Embodiment 1 described above, the selection unit 1120 sets the selection range based on a plurality of positions differently distanced from the user, the plurality of positions being designated by the fingertips of the hands of the user. Since the range in the depth direction of the selection range is specified based on the plurality of positions differently distanced from the user, the user can easily select a desired virtual object from the plurality of virtual objects that are overlappingly placed in the depth direction in the three-dimensional space.

Modification

In Embodiment 1 described above, the example in which the user specifies the selection range by using both hands has been described. In a modification, the user may specify the selection range by designating a plurality of positions differently distanced from the user with one hand. For example, the user can specify the selection range by sequentially determining the position indicated by the forefinger of the left hand 3020 and the position indicated by the forefinger of the right hand 3030 in FIG. 3C with one hand. For example, when the amount of movement of one hand detected for a predetermined time has become equal to or less than a threshold, the selection unit 1120 can determine the position indicated by the one hand as the position designated by the user. The user can select a desired virtual object with one hand even when holding an HHD, a tablet, or the like with the other hand.

Embodiment 2

In Embodiment 1, the selection range is set by using information on the positions of the fingertips. Whereas, in Embodiment 2, a selection range is set by using position information on a plurality of parts of hands.

Figure 4A:
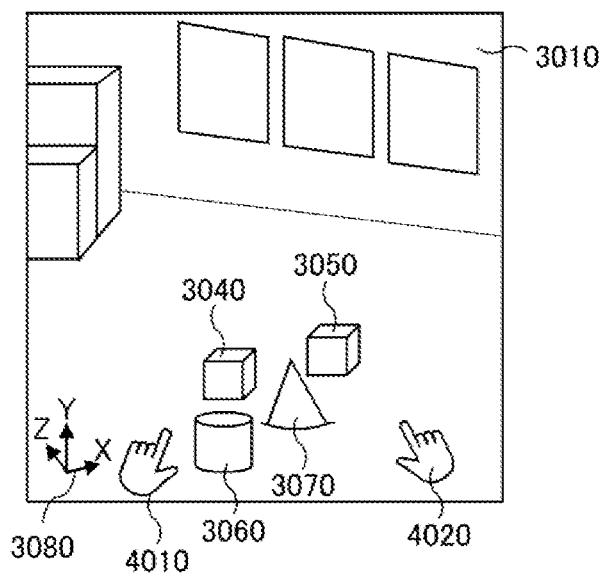
FIGS. 4A to 4E illustrate examples of operations for selecting a virtual object according to Embodiment 2.

FIGS. 4A to 4E illustrate examples of operations for selecting a virtual object according to Embodiment 2. FIGS. 4A to 4E illustrate examples of combined images (MR images) generated by the image combining unit 1140. The same objects as those in FIGS. 3A to 3E are denoted by the same reference numerals, and description thereof will be omitted. FIG. 4A illustrates the same state as in FIG. 3A.

Figure 4B:
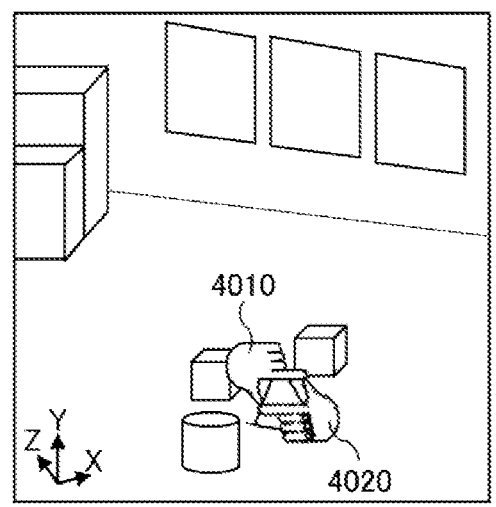

As in FIG. 3B, FIG. 4B illustrates a state in which the selection mode for updating the selected state of the virtual object starts. The position and posture acquisition unit 1110 acquires the positions of a left hand 4010 and a right hand 4020 of the user and detects that the thumb and forefinger of the left hand 4010 form an L shape and the thumb and forefinger of the right hand 4020 from an L shape so as to form a rectangular frame shape. When the frame shape formed by the hands of the user is detected, the selection unit 1120 can start the selection mode.

In this example, the left hand 4010 and the right hand 4020 form a rectangle with their respective fingers in contact with each other. However, the formation of the rectangle is not limited to this example, and the rectangle may be formed by their fingers not in contact with each other. In addition, FIG. 4B illustrates the example in which the frame shape is formed so as to be parallel to the XY plane in front of the user. However, the frame shape may be formed at a position deviated from the front of the user or may be formed so as to have a tilt with respect to the XY plane. The frame shape may also be formed such that each side of the frame shape is tilted with respect to the X-axis and the Y-axis.

Figure 4C:
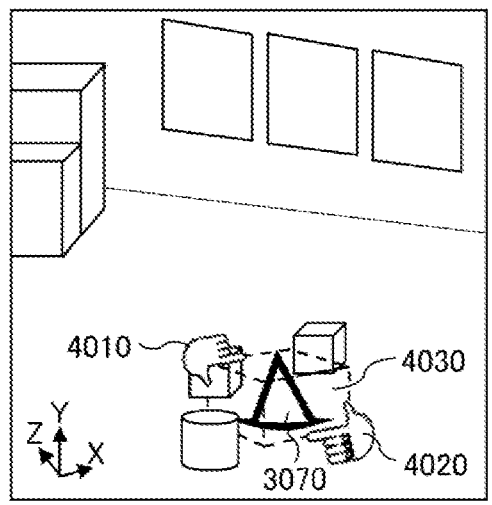

FIG. 4C illustrates a state in which the left hand 4010 and the right hand 4020 of the user move away from each other from the state in FIG. 4B and the selection unit 1120 sets a selection range 4030 based on the shape of the moved hands. The selection unit 1120 sets the selection range 4030 based on position information on the thumb and forefinger of the left hand 4010 of the user and position information on the thumb and forefinger of the right hand 4020 of the user. The set selection range 4030 may be indicated by a dotted line as illustrated in FIG. 4C. Details of the method for setting the selection range 4030 by using the position information of the thumbs and forefingers of the user will be described below with reference to FIGS. 5A to 5H.

Figure 4D:
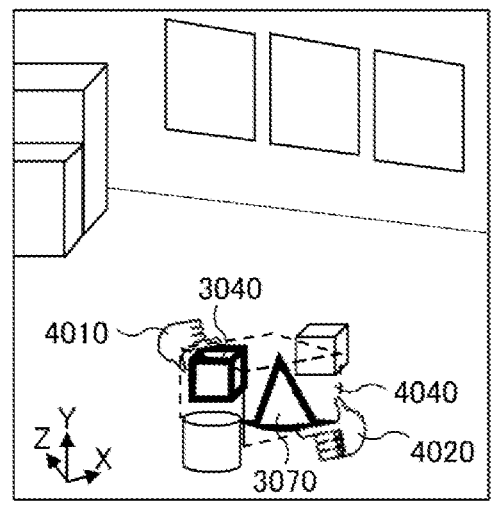

FIG. 4D illustrates a state in which the left hand 4010 of the user moves in a direction away from the right hand 4020 of the user from the state in FIG. 4C and the selection range 4030 is expanded to a selection range 4040. A virtual object 3040 and a virtual object 3070 are included in the selection range 4040, and the virtual objects 3040 and 3070 are displayed in a mode indicating the selected state.

Figure 4E:
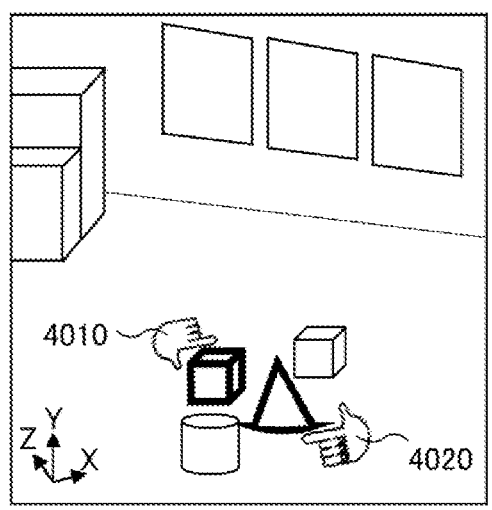

FIG. 4E illustrates a state in which the amount of movement of the left hand 4010 and the right hand 4020 of the user from the state in FIG. 4D has become equal to or less than a threshold, the movement being detected for a predetermined time. When the selection range 4040 is set and the selected state of the virtual objects is updated, the selection mode is ended. When the selection mode is ended, the selection range 4040 that has been indicated by the dotted line may be hidden.

FIGS. 5A to 5H describe a method for setting a selection range according to Embodiment 2 and illustrate a procedure in which the selection unit 1120 sets the selection range 4030 in FIG. 4C. The same objects as those in FIGS. 4A to 4E are denoted by the same reference numerals, and description thereof will be omitted.

Figure 5A:
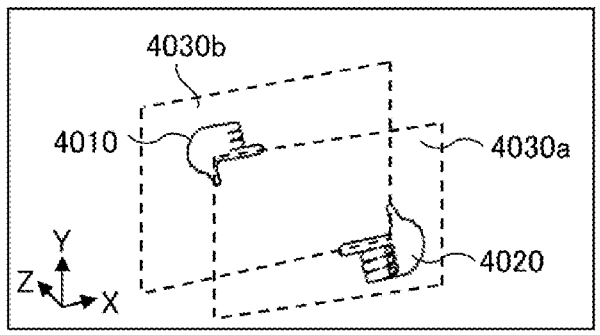
FIGS. 5A to 5H illustrate a method for setting a selection range according to Embodiment 2.

FIG. 5A illustrates a plane 4030$a$ that passes through the thumb and forefinger of the left hand 4010 of the user and a plane 4030$b$ that passes through the thumb and forefinger of the right hand 4020 of the user. The plane 4030$a$ and the plane 4030$b$ are planes including two opposing faces of the selection range 4030.

Figure 5B:
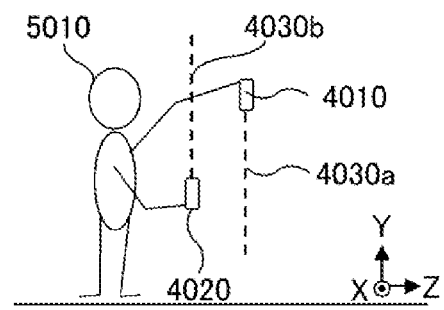

FIG. 5B is an elevational view in which a positional relationship among a user 5010, the left hand 4010 and the right hand 4020 of the user, and the plane 4030$a$ and the plane 4030$b$ in FIG. 5A is viewed from a side of the user 5010. The left hand 4010 and the right hand 4020 of the user 5010 are located at different positions in the depth direction (Z-axis direction). The selection unit 1120 defines the plane 4030$a$ based on the position information on the thumb and forefinger of the left hand 4010 of the user. The selection unit 1120 defines the plane 4030$b$ based on the position information on the thumb and forefinger of the right hand 4020 of the user.

Figure 5C:
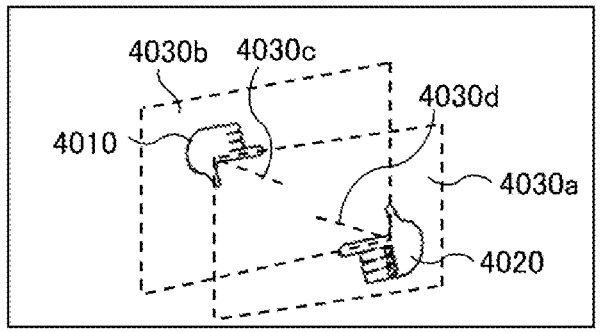
Figure 5D:
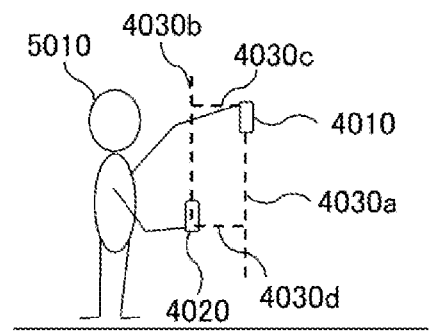

FIG. 5C illustrates a state in which an axis 4030$c$ is extended from the position of the left hand 4010 on the plane 4030$a$ to the plane 4030$b$ and an axis 4030$d$ is extended from the position of the right hand 4020 on the plane 4030$b$ to the plane 4030$a$. FIG. 5D is a diagram in which a positional relationship among the user 5010, the left hand 4010 and the right hand 4020 of the user, and the axis 4030$c$ and the axis 4030$d$ in FIG. 5C is viewed from a side of the user 5010.

The axis 4030$c$ may be extended from the position (position of the base of the thumb and forefinger) of the left hand 4010 to the plane 4030$b$ so as to be perpendicular to the plane 4030$a$ or the plane 4030$b$. The axis 4030$d$ may be extended from the position (position of the base of the thumb and forefinger) of the right hand 4020 to the plane 4030$a$ so as to be perpendicular to the plane 4030$a$ or the plane 4030$b$. Further, the axis 4030$c$ and the axis 4030$d$ may be determined such that the selection range 4030 has a frustum shape having its bottom face on the far side.

Figure 5E:
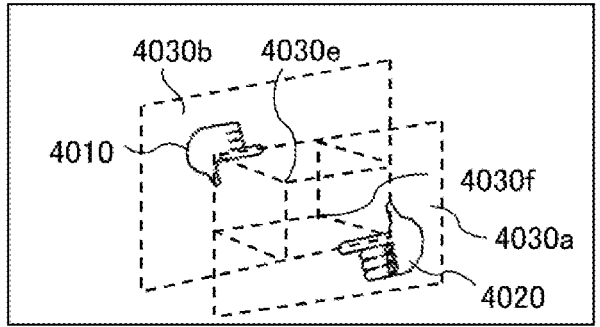
Figure 5F:
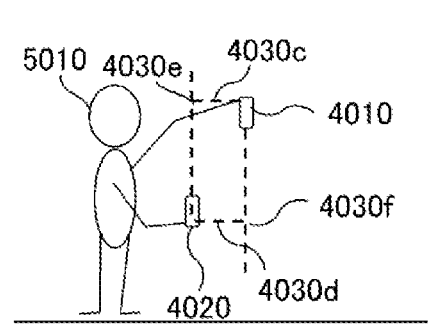

FIG. 5E illustrates a state in which each face of the selection range 4030 is determined by using an intersection point 4030$e$ of the axis 4030$c$ and the plane 4030$b$ and an intersection point 4030$f$ of the axis 4030$d$ and the plane 4030$a$. FIG. 5F is an elevational view in which a positional relationship among the user 5010, the left hand 4010 and the right hand 4020 of the user, and the intersection point 4030$e$ and the intersection point 4030$f$ in FIG. 5E is viewed from a side of the user 5010.

The selection unit 1120 sets, on the plane 4030$b$, a rectangular area 4030B whose diagonal line is formed between the intersection point 4030$e$ and the position of the right hand 4020, for example. The selection unit 1120 sets, on the plane 4030$a$, a rectangular area 4030A whose diagonal line is formed between the intersection point 4030$f$ and the position of the left hand 4010. The selection unit 1120 can determine the selection range 4030 by setting the rectangular area 4030A and the rectangular area 4030B as two opposing faces.

Figure 5G:
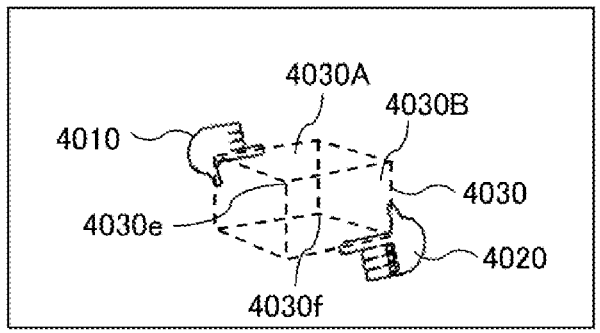
Figure 5H:
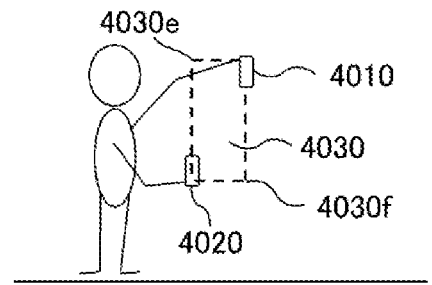

FIG. 5G illustrates a state in which the selection range 4030 illustrated in FIG. 4C is set. FIG. 5H is an elevational view in which a positional relationship between the user 5010 and the set selection range 4030 in FIG. 5G is viewed from a side of the user 5010. The selection unit 1120 may adjust the sizes of the rectangular area 4030A and the rectangular area 4030B so that the selection range 4030 has a frustum shape having its bottom face on the far side. By forming the selection range 4030 in a frustum shape, the misalignment between the selection range 4030 and the visible range of the user is reduced. Thus, the user can easily select a desired virtual object.

In Embodiment 2 described above, the selection unit 1120 sets the selection range based on a plurality of positions that are designated by using a plurality of parts of the hands of the user and that are differently distanced from the user. Since the range in the depth direction of the selection range is specified based on the plurality of positions differently distanced from the user, the user can easily select a desired virtual object from the plurality of virtual objects that are overlappingly placed in the depth direction in the three-dimensional space.

Modification

In Embodiment 2 described above, FIG. 4B illustrates the example in which the shape of the hands of the user is a rectangular shape formed by the left thumb and forefinger and the right thumb and forefinger. However, the shape of the hands of the user may be a circular shape or a part of a circular shape formed by the left thumb and forefinger forming an arc shape and the right thumb and forefinger forming an arc shape. In this case, the selection unit 1120 sets a selection range having a shape of a frustum of circular cone. The user can set a selection range having a shape of a frustum of pyramid or a shape of a frustum of circular cone by changing the shape of the fingers in accordance with the virtual object to be selected.

In addition, in Embodiment 2 described above, the selection unit 1120 sets the selection range by using the position information on the thumbs and forefingers as the information on the plurality of positions of the hands of the user. However, information on three-dimensional outlines of the hands may also be used. By using the information on three-dimensional outlines of the hands, the selection unit 1120 can also set a selection range along the outlines of the hands, such as an area surrounded by both of the entire hands of the user.

Embodiment 3

In Embodiments 1 and 2, it is assumed that the virtual objects are placed within the reach of the hands of the user. Whereas, Embodiment 3 is an embodiment in a case where virtual objects are placed even in a range out of the reach of the hands of the user.

In Embodiment 3, a selection unit 1120 sets a selection range based on a relative positional relationship among the hands as the operation body and virtual objects. The selection unit 1120 associates the virtual object with a range in the depth direction in which the operation body (hands) move and sets a selection range so as to include the virtual object associated with a range in the depth direction corresponding to a plurality of positions designated by the operation body.

Specifically, for example, the selection unit 1120 sets a selection range by using a range in the depth direction in which the hands move and the number of virtual objects present in a range obtained by extending, in the depth direction, a plurality of positions (frame shapes or the like) designated by the hands of the user. The selection unit 1120 divides the range in the depth direction in which the hands move by dividing lines corresponding to the number of virtual objects so that the selection unit 1120 can set the selection range based on the positional relationship among the hands of the user specifying the selection range and the dividing lines. Assuming that the range in the depth direction in which the hands move is viewed in a plan view, while the following description describes that the range in which the hands move is divided by dividing lines, the range is actually divided by boundaries such as planes or areas. Thus, the range in which the hands move may be divided such that the virtual object can be selected based on a plurality of positions designated by the user using the operation body and may be divided by boundaries (planes, areas, or the like) based on the number, positions, and the like of virtual objects.

FIGS. 6A to 6E illustrate examples of operations for selecting a virtual object according to Embodiment 3. FIGS. 6A to 6E illustrate examples of combined images (MR images) generated by the image combining unit 1140. The same objects as those in FIGS. 3A to 3E are denoted by the same reference numerals, and description thereof will be omitted.

Objects representing a left hand 6050 and a right hand 6060 of the user are placed in a combined image obtained by combining a real space image 3010 and a virtual space image. In the combined image, objects representing virtual objects 6010, 6020, 6030, and 6040 are placed at positions out of reach of the user. FIGS. 7A and 7B are elevational views each illustrating a positional relationship in the depth direction among the user who is viewing the images illustrated in FIGS. 6A to 6E and the virtual objects. In FIGS. 7A and 7B, the same objects and the like as those in FIGS. 6A to 6E are denoted by the same reference numerals, and description thereof will be omitted.

FIGS. 7A and 7B schematically illustrate a user 7010, boundary lines 7080 and 7090 of the field of view of the user 7010, and boundary lines 7100, 7110, and 7120 each connecting the viewpoint of the user 7010 and the position of the hand.

A position 7020 in the depth direction indicates the closest distance at which a camera of an imaging unit 1010 can recognize the positions of the hands of the user or the position of a near face (front face) of a view frustum, which is a range captured by the camera. The closest distance may be a preset value or may be a value adjusted in accordance with the display device 1000. A position 7070 indicates a position of the farthest distance that the hand of the user can reach. The farthest distance may be a preset value or may be a value adjusted for each user.

A range (hereinafter, referred to as a moving range W) from the position 7020 to the position 7070, which is a range in the depth direction in which the hands move, is divided by dividing lines 7030, 7040, 7050, and 7060. The number of dividing lines dividing the moving range W of the hands is determined in accordance with the number of virtual objects placed in the range surrounded by the boundary lines 7100 and 7110 each connecting the viewpoint of the user 7010 and the position of the hand. In the examples of FIGS. 7A and 7B, the number of virtual objects included in the range surrounded by the boundary lines 7100 and 7110 is four. Therefore, the selection unit 1120 divides the moving range W of the hands at the positions of the four dividing lines 7030, 7040, 7050, and 7060. The image generation unit 1130 may generate objects representing boundaries (planes or areas) corresponding to the dividing lines, place the objects in the virtual space, and display the objects on a display unit 1020, or the image generation unit 1130 may not generate objects corresponding to the dividing lines and may not display the objects on the display unit 1020.

Each dividing line may divide the moving range W of the hands at equal intervals as illustrated in FIGS. 7A and 7B. Alternatively, each dividing line may divide the moving range W at an interval based on a distance between corresponding virtual objects. For example, the distance between the virtual object 6030 and the virtual object 6020 is longer than the distance between the virtual object 6020 and the virtual object 6010. In this case, the selection unit 1120 determines the positions of the dividing lines such that the distance between the dividing line 7040 and the dividing line 7050 is longer than the distance between the dividing line 7050 and the dividing line 7060. In this way, the selection unit 1120 can associate the virtual objects with the moving range W of the hands at equal intervals or at intervals based on the distance between the virtual objects. By dividing the moving range W of the hands in accordance with the distance between the virtual objects, the user can specify the range in the depth direction of the selection range in accordance with the actual distance (interval) between the virtual objects without giving a sense of incongruity.

However, in a case where the positions of the plurality of virtual objects in the depth direction are approximately the same, if the position of the dividing line is determined in accordance with the distance between the virtual objects, it is difficult to select an intended virtual object from the virtual objects whose positions are approximately the same. Therefore, when performing display control on a plurality of virtual objects, the selection unit 1120 may associate the plurality of virtual objects with a range in the depth direction in which the operation body move at intervals equal to or more than a predetermined threshold. The predetermined threshold may be set to a value that allows the user to select, as intended, the selected state of individual one of the plurality of virtual objects whose positions in the depth direction are approximately the same. By setting the distance between adjacent dividing lines to be equal to or more than the predetermined threshold, the user can set the selection range so as to include a desired virtual object even when the positions of the plurality of virtual objects in the depth direction are approximately the same.

In a case where the dividing line 7030 is set within the range in the depth direction designated by the hands of the user, the selection unit 1120 sets the selection range so as to include the virtual object 6040 that corresponds to the dividing line 7030. Similarly, in a case where the dividing lines 7040, 7050, and 7060 are set in the range in the depth direction designated by the hands of the user, the selection unit 1120 sets the selection ranges so as to include the virtual objects 6030, 6020, and 6010, respectively.

Figure 6A:
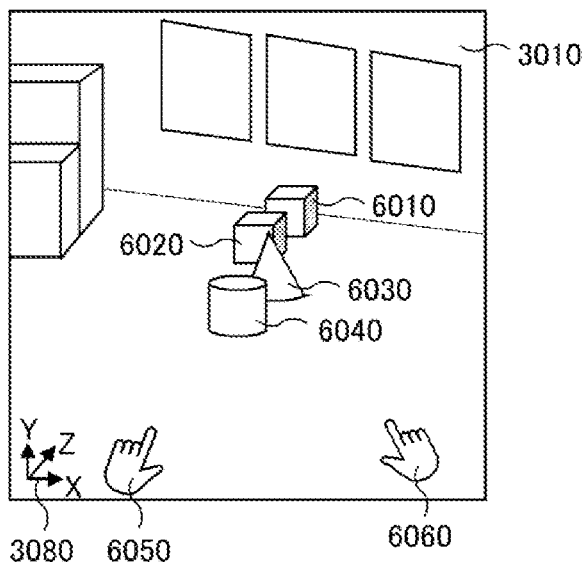
FIGS. 6A to 6E illustrate examples of operations for selecting a virtual object according to Embodiment 3.
Figure 7A:
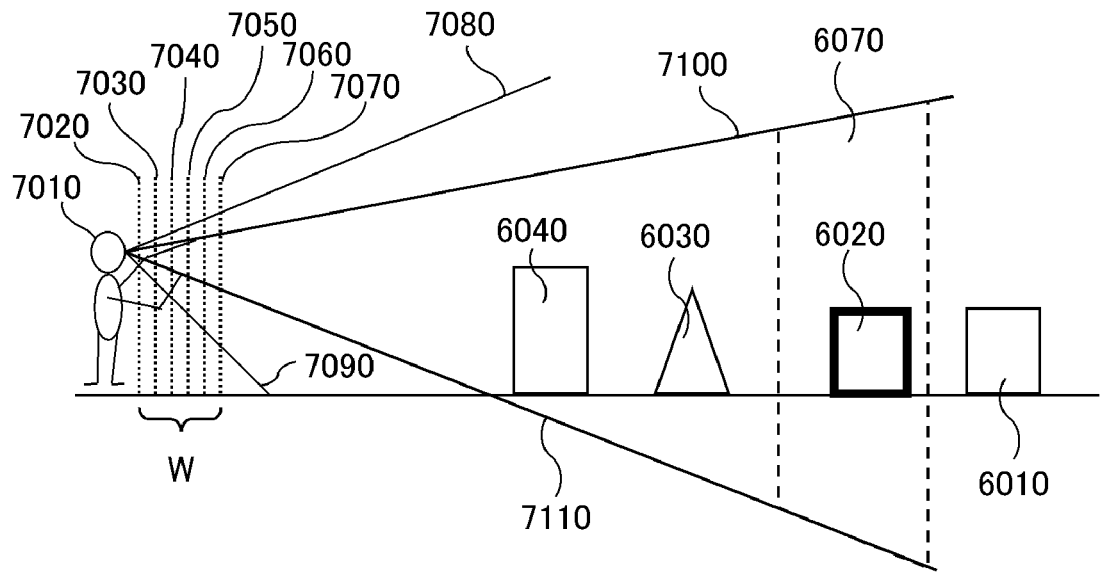
FIGS. 7A and 7B are elevational views each illustrating a positional relationship between the hands of a user and virtual objects.
Figure 7B:
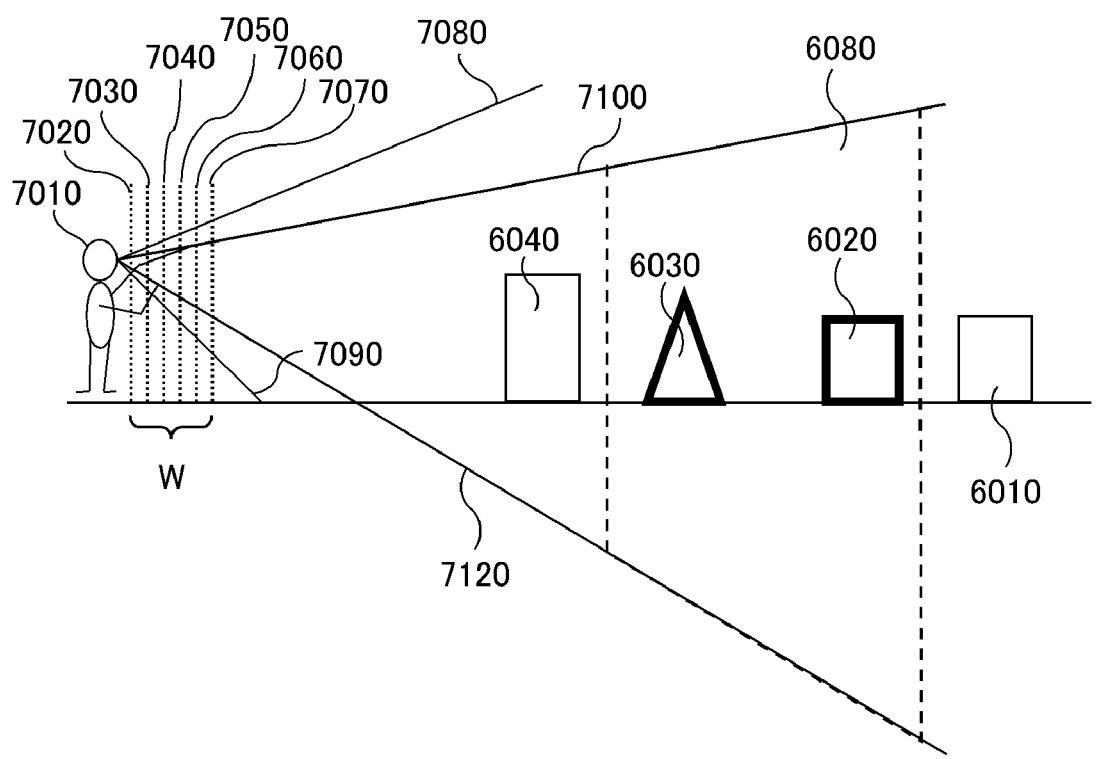

FIG. 6A illustrates a state in which there is no change in the selected state of the virtual objects in the virtual space. The image generation unit 1130 generates a virtual space image based on the position and posture of the imaging unit 1010 acquired by a position and posture acquisition unit 1110. The image combining unit 1140 combines the virtual space image and a real space image captured by the imaging unit 1010 to generate an MR image (combined image).

Figure 6B:
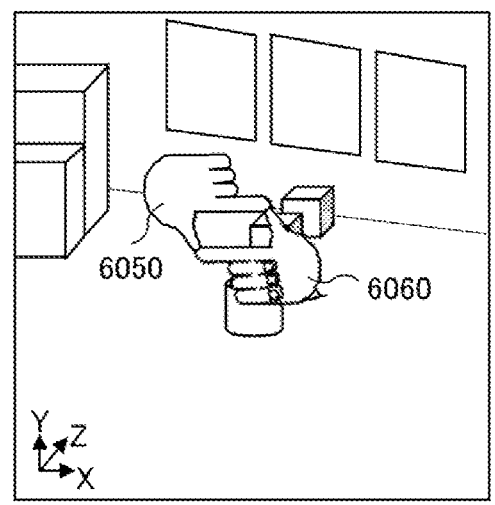

FIG. 6B illustrates a state in which a selection mode for changing the selected state of a virtual object starts. In FIG. 6B, the distance from the user 7010 to each of the left hand 6050 and right hand 6060 of the user is approximately half the distance to the hand of the user when the user fully extends his or her arm.

The position and posture acquisition unit 1110 acquires the positions of the left hand 6050 and the right hand 6060 of the user and detects that the thumb and forefinger of the left hand 6050 form an L shape and the thumb and forefinger of the right hand 6060 form an L shape so as to form a rectangular frame shape. The selection unit 1120 can start the selection mode when the frame shape formed by the hands of the user is detected. Although FIG. 6B illustrates the example in which the frame shape is formed so as to be parallel to the XY plane in front of the user, the frame shape may be formed at a position deviated from the front of the user or may be formed so as to be tilted with respect to the XY plane. The frame shape may be formed such that each side is tilted with respect to the X-axis and the Y-axis.

Figure 6C:
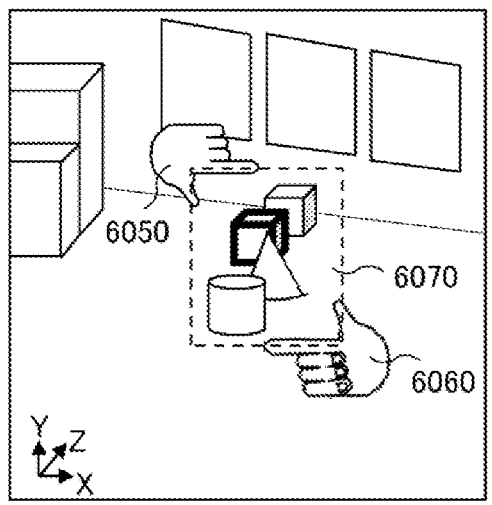

FIG. 6C illustrates a state after the left hand 6050 and the right hand 6060 of the user have moved from the state in FIG. 6B. The left hand 6050 of the user moves in the upper left direction with respect to the field of view of the user while maintaining the distance in the depth direction. The right hand 6060 of the user moves in a lower right direction with respect to the field of view of the user and also moves to the near side.

The selection unit 1120 sets a selection range 6070 based on the viewpoint of the user 7010, position information on the left hand 6050 and the right hand 6060 of the user, and the number of virtual objects included in the range surrounded by the right and left hands. In FIG. 6C, in a case where the left hand 6050 and the right hand 6060 of the user are projected onto the combined image in the three-dimensional space, four virtual objects are present in a range obtained by extending, in the depth direction, a rectangle formed by the thumbs and the forefingers of the left hand 6050 and the right hand 6060 of the user. The selection unit 1120 sets the selection range 6070 based on the positional relationship among the virtual objects and the positional relationship between the right and left hands in the depth direction.

A method for setting the selection range 6070 based on the positional relationship among the virtual objects and the positional relationship between the right and left hands in the depth direction will be described with reference to FIG. 7A. FIG. 7A is an elevational view illustrating the positional relationship in the depth direction among the user 7010 viewing the image of FIG. 6C and the virtual objects. The dividing line 7050 is included between the left hand and the right hand of the user. Therefore, the selection unit 1120 sets the selection range 6070 so as to include the virtual object 6020 corresponding to the dividing line 7050 and changes the state of the virtual object 6020 to the selected state.

Figure 6D:
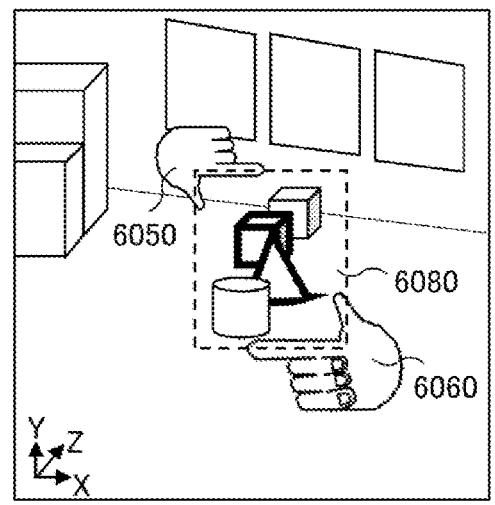

FIG. 6D illustrates a state in which the right hand 6060 of the user has moved to the near side from the state in FIG. 6C. The selection unit 1120 updates the selection range 6070 by extending the selection range 6070 to the near side. A selection range 6080 obtained by the update includes the virtual object 6020 and the virtual object 6030.

A method for setting the selection range 6080 based on the positional relationship among the virtual objects and the positional relationship between the right and left hands in the depth direction will be described with reference to FIG. 7B. FIG. 7B is an elevational view illustrating the positional relationship in the depth direction among the user 7010 viewing the image of FIG. 6D and the virtual objects. The dividing line 7040 and the dividing line 7050 are included between the left hand and the right hand of the user. Therefore, the selection unit 1120 sets the selection range 6080 so as to include the virtual object 6020 and the virtual object 6030 corresponding to the dividing line 7040 and the dividing line 7050, respectively. The selection unit 1120 changes the states of the virtual object 6020 and the virtual object 6030 to the selected state.

Figure 6E:
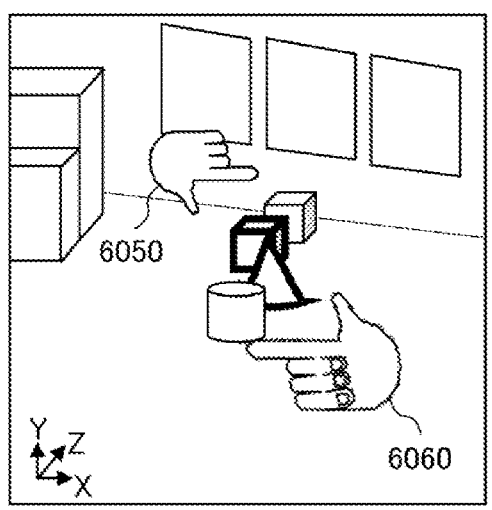

FIG. 6E illustrates a state in which the amount of movement of the left hand 6050 and the right hand 6060 of the user from the state in FIG. 6D has become equal to or less than a threshold, the movement being detected for a predetermined time. In a case where the selection range 6080 is set and the selected state of the virtual objects is updated, the selection mode is ended. When the selection mode is ended, the selection range 6080 that has been indicated by the dotted line may be hidden.

In Embodiment 3 described above, the selection unit 1120 sets the selection range based on the relative positional relationship between the range in which the hands move and the range in which the virtual objects are placed in the depth direction. As a result, the user can select a desired virtual object as intended from the plurality of virtual objects that are overlappingly placed in the depth direction in the three-dimensional space.

Modification

In the above-described embodiments, the imaging unit 1010 has one camera. However, the imaging unit 1010 may be, for example, a stereo camera having two cameras corresponding to the right and left eyes of the user. In the case where the imaging unit 1010 is a stereo camera, the selection range 6070 in FIG. 6C and the selection range 6080 in FIG. 6D may be set as ranges that can be viewed by both the cameras of the stereo camera.

In addition, the selection range 6070 and the selection range 6080 may be set as ranges that can be viewed by the camera corresponding to the open eye or the dominant eye of the left and right eyes of the user. The open eye and the dominant eye can be detected by a known technique. The dominant eye may be set in advance and may be set by the user.

In each embodiment described above, the selection unit 1120 performs the processing for setting the selection range and updating the selected state of the virtual objects only once. However, the processing may be performed a plurality of times. The selection unit 1120 may set a plurality of selection ranges by repeating the processing for setting the selection range a plurality of times. The selection unit 1120 updates the selected state of the virtual objects included in the plurality of set selection ranges.

In each embodiment described above, the selection unit 1120 switches the state of the virtual object included in the selection range from the deselected state to the selected state. However, the present invention is not limited thereto. The selection unit 1120 may switch the state of the virtual object included in the selection range from the selected state to the deselected state. For example, in a case where the selection range is specified by a predetermined operation, such as in a case where the selection range is specified by using a thumb directed outward or in a case where the selection range is specified by using the fingertip of a thumb, the selection unit 1120 switches the state of the virtual object in the selection range from the selected state to the deselected state. Note that the predetermined operation may be an operation using a controller.

Furthermore, when switching the state of the virtual object included in the selection range from the selected state to the deselected state, the selection unit 1120 may switch between the selected state and the deselected state of the virtual object by changing the state of the virtual object not included in the selection range to the selected state. In a case where the virtual object in the selected state and the virtual object in the deselected state are mixed in the selection range, the selection unit 1120 may switch between the selected state and the deselected state of the virtual objects included in the selection range.

In each embodiment described above, the selection unit 1120 sets the selection range, updates the selected state of the virtual object, and determines the selection range. The determined selection range may be moved in accordance with an operation by the user. For example, when receiving an operation for moving a frame indicating the determined selection range from the user, the selection unit 1120 moves the selection range and updates the selected state of the virtual object based on the moved selection range. By moving the determined selection range, the user can adjust the position of the selection range and easily select a desired virtual object. When moving the selection range, the selection unit 1120 may adjust the size of the selection range in accordance with the distance from the position of the user. For example, the selection unit 1120 may extend the selection range in the directions (the X-axis direction and the Y-axis direction) perpendicular to the depth direction as the distance from the position of the user increases.

In each embodiment described above, by setting the position of an eye (viewpoint) of the user as a reference position, the selection unit 1120 sets, as the selection range, a frustum-shaped range extending from the reference position in the direction in which the virtual object is placed. However, the reference position is not limited to the position of the eyes of the user. This is because, in a case where the position of the eye of the user is set as the reference position, the frustum shape may not be extended in the direction in which the virtual object is placed depending on the positions of the hands of the user specifying the selection range.

For example, the selection unit 1120 may set a position (abdomen, chest, or the like) other than the position of the eye as a reference position in accordance with the positions of the hands of the user specifying the selection range. The selection unit 1120 can set, as the selection range, a frustum-shaped range extending from the reference position determined in accordance with the positions of the hands of the user specifying the selection range, in a direction in which the virtual object is placed, passing through the positions of the hands of the user.

Specifically, in a case where the user specifies the selection range by using the thumb and forefinger of the left hand forming an L shape and the thumb and forefinger of the right hand forming an L shape, the reference position may be set to a position at which a straight line intersects the user, the straight line passing through the midpoint between the bases of the right and left thumbs and being approximately perpendicular to two planes specified by the right thumb and forefinger and the left thumb and forefinger. The user can appropriately set the selection range by changing the reference position based on the positions of the hands of the user specifying the selection range.

Embodiment 4

In the above embodiments, each unit included in the information processing apparatus 1100 illustrated in FIG. 1 is configured by hardware. In Embodiment 4, a part of the configuration of the information processing apparatus 1100 may be configured by software. The information processing apparatus 1100 according to the present embodiment is a computer that implements a part of the operation described in each of the above embodiments by executing software and implements the remaining operation (functions) as hardware.

Figure 8:
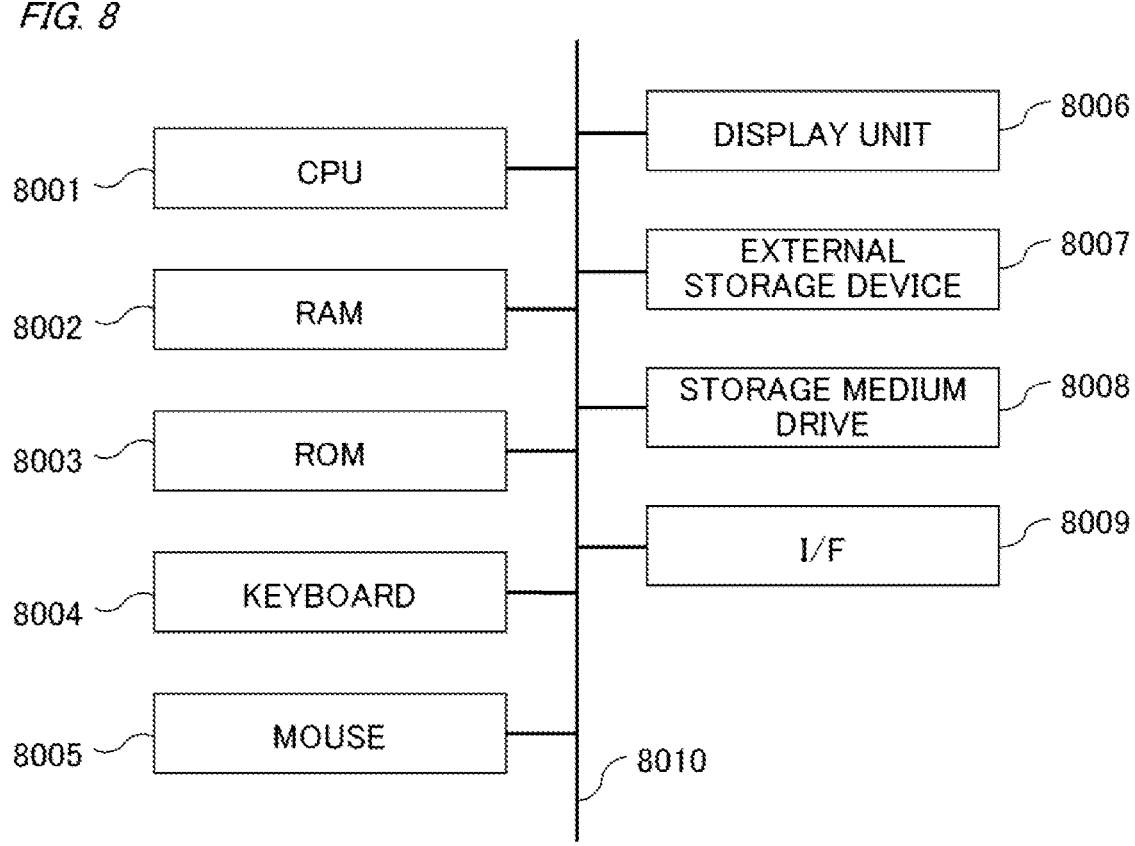
FIG. 8 is a block diagram illustrating an example of a hardware configuration of the information processing apparatus.

FIG. 8 is a block diagram illustrating a hardware configuration example of a computer applicable to the information processing apparatus 1100. A CPU 8001 controls the entire computer by using programs and date stored in a RAM 8002 and a ROM 8003 and performs each process of the information processing apparatus 1100 described in each embodiment described above.

The RAM 8002 has an area for temporarily storing programs and data loaded from an external storage device 8007 or a storage medium drive 8008. The RAM 8002 includes an area for temporarily storing data received from an external apparatus via an interface (I/F) 8009. The external device is, for example, the display device 1000. The data received from the external apparatus is, for example, a real space image and an input value generated by an input device of the display device 1000 based on an operation from the user.

The RAM 8002 also has a work area used when the CPU 8001 performs each process. That is, the RAM 8002 can provide various areas as appropriate. For example, the RAM 8002 also functions as the data storage unit 1150 illustrated in FIG. 1.

The ROM 8003 is a nonvolatile memory for storing setting date and a boot program of the computer.

A keyboard 8004 and a mouse 8005 are examples of an operation input device and can be operated by a user of the computer to input various instructions to the CPU 8001.

A display unit 8006 is, for example, a CRT display or a liquid-crystal display and can display results of the process performed by the CPU 8001 in the form of images, characters, and the like. For example, the display unit 8006 can display a message and the like for measuring the position and posture of the display device 1000.

The external storage device 8007 is a large-capacity information storage device represented by a hard disk drive. The external storage device 8007 stores an operating system (OS) and programs and date for causing the CPU 8001 to perform each process of the information processing apparatus 1100.

The programs stored in the external storage device 8007 include programs corresponding to the processing performed by the position and posture acquisition unit 1110, the selection unit 1120, the image generation unit 1130, and the image combining unit 1140. The data stored in the external storage device 8007 includes the information described as known information and various kinds of setting information in addition to the data of a virtual space. The programs and date stored in the external storage device 8007 are loaded onto the RAM 8002 as appropriate by the control of the CPU 8001. The CPU 8001 performs each process of the information processing apparatus 1100 by executing the programs and date loaded onto the RAM 8002. The external storage device 8007 may also be used as the data storage unit 1150 illustrated in FIG. 1.

The storage medium drive 8008 reads programs and data recorded in a computer-readable storage medium such as a CD-ROM or a DVD-ROM or writes programs and data in these storage media. Some or all of the programs and data stored in the external storage device 8007 may be recorded on these storage media. The programs and data read from the storage medium by the storage medium drive 8008 are output to the external storage device 8007 or the RAM 8002.

The I/F 8009 is a digital input/output port such as an analog video port or IEEE 1394 for connecting the imaging unit 1010 of the display device 1000. The I/F 8009 may be an Ethernet (registered trademark) port for outputting the combined image to the display unit 1020 of the display device 1000. The data received via the I/F 8009 is input to the RAM 8002 or the external storage device 8007. In a case where a sensor system is used for obtaining position and posture information by the position and posture acquisition unit 1110, the I/F 8009 is used as an interface for connecting the sensor system. A bus 8010 connects the units illustrated in FIG. 8 to each other.

According to the present invention, the user can easily select a desired virtual object from the plurality of virtual objects that are overlappingly placed in the depth direction in the three-dimensional space.

Other Embodiments

The present disclosure includes a case where a software program is directly or remotely supplied to a system or an apparatus, and a computer of the system or the apparatus reads and executes a supplied program code to achieve the functions of the above-described embodiments. The program supplied to the system or the apparatus is a program for executing the processing corresponding to the flowchart described in FIG. 2.

The functions in the above-described embodiments may be realized by a computer executing a read program or may be realized in cooperation with an OS or the like operating on the computer based on an instruction of the program. In this case, the functions in each embodiment are realized by the OS or the like executing a part or all of the functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-168587, filed on Oct. 20, 2022, which is hereby incorporated by reference herein in its entirety.

What is claimed is:

1. An information processing apparatus comprising:
 a processor; and
 a memory storing a program which, when executed by the processor, causes the information processing apparatus:
  execute display control processing of performing display control of a plurality of virtual objects such that the plurality of the virtual objects are placed in a three-dimensional space that serves as a field of view of a user;
  execute determination processing of determining whether a selection mode for switching a state of any of the plurality of the virtual objects between a selected state and a deselected state is started or not;
  execute setting processing of setting, in a case where the selection mode has been started, a selection range in the three-dimensional space based on a plurality of positions having different distances in a depth direction from the user, the plurality of positions being designated by using an operation body located at a position of a hand of the user; and
  execute selection processing of, among the plurality of the virtual objects, switching the state of the virtual object included in the selection range to the selected state and switching the state of the virtual object not included in the selection range to the deselected state,
 wherein the selection range has a frustrum shape with the user's side as a top face,
 the top face of the selection range is included in a first plane defined based on a first position being designated by using the operation body, and
 a bottom face of the selection range is included in a second plane defined based on a second position which is further from the user in the depth direction than the first position.

2. The information processing apparatus according to claim 1, wherein
the operation body is the hand of the user; and
in the setting processing, the selection range, having a shape of a frustum of circular cone or a frustum of pyramid, is set based on shapes formed by the hands or fingers of the user.

3. The information processing apparatus according to claim 1, wherein in the selection processing,
it is determined that the virtual object is included in the selection range in a case where the virtual object is partially included in the selection range, in a case where the virtual object is entirely included in the selection range, or in a case where a center of gravity of the virtual object is included in the selection range, and
a state of the virtual object included in the selection range is switched between a selected state and a deselected state.

4. The information processing apparatus according to claim 1, wherein in the setting processing, the selection range is set based on a relative positional relationship among the operation body and the virtual object.

5. The information processing apparatus according to claim 4, wherein in the setting processing, the virtual object is associated with a range in a depth direction in which the operation body moves and the selection range is set so as to include the virtual object associated with a range in the depth direction corresponding to the plurality of positions designated by the operation body.

6. The information processing apparatus according to claim 5, wherein in the setting processing, the virtual object is associated with a range in a depth direction in which the operation body moves at equal intervals or at intervals based on a distance between virtual objects.

7. The information processing apparatus according to claim 6, wherein, in a case where display control of a plurality of virtual objects is performed, the plurality of virtual objects are associated with a range in a depth direction in which the operation body moves at an interval equal to or more than a predetermined threshold.

8. The information processing apparatus according to claim 1, wherein in the selection processing, a state of the virtual object included in the selection range is switched to a deselected state in a case where the selection range is set by a predetermined operation performed by the operation body.

9. The information processing apparatus according to claim 8, wherein in the selection processing, a state of the virtual object not included in the selection range is switched to a selected state in a case where the selection range is set by the predetermined operation.

10. The information processing apparatus according to claim 1, wherein the plurality of positions are designated by one hand of the user.

11. The information processing apparatus according to claim 1, wherein in the setting processing, a plurality of selection ranges are set.

12. The information processing apparatus according to claim 1, wherein
in the setting processing, the selection range is moved in accordance with an operation by the operation body, and
in the selection processing, a state of the virtual object between a selected state and a deselected state is switched based on the selection range after moved.

13. The information processing apparatus according to claim 12, wherein, when moving the selection range, in the setting processing, a size of the selection range is adjusted in accordance with a distance from a position of the user to the selection range.

14. The information processing apparatus according to claim 1, wherein in the setting processing, a position of an eye of the user is set as a reference position and a range is set as the selection range, the range having a frustum shape that extends from the reference position in a direction in which the virtual object is placed, passing through the plurality of positions.

15. The information processing apparatus according to claim 1, wherein in the setting processing, a position is set based on the plurality of positions designated by the hand of the user as a reference position and a range having a frustum shape is set as the selection range, the range extending from the reference position in a direction in which the virtual object is placed and passing through the plurality of positions.

16. The information processing apparatus according to claim 1, wherein an image of the three-dimensional space is a combined image in which the virtual object is placed on a real space image captured by a stereo camera.

17. The information processing apparatus according to claim 1, wherein the selection mode is started when:
a distance between a left hand and a right hand of the user becomes equal to or less than a first threshold,
an amount of movement of the user's hands detected for a first predetermined time is equal to or less than a second threshold,
a distance between the left hand and the right hand of the user is equal to or less than a third threshold for a second predetermined time, or
the user changes a shape of the user's hands to a predetermined shape.

18. The information processing apparatus according to claim 1, wherein the selection mode is started in accordance with an operation by the user from an input device, or with an instruction given by a line of sight or voice of the user.

19. The information processing apparatus according to claim 1, wherein in the setting processing,
on the first plane, a first rectangular area is set whose diagonal is formed between (i) an intersection point of a line substantially orthogonal to the first plane and extended from the second position on the second plane, and (ii) the first position on the first plane, and
on the second plane, a second rectangular area is set whose diagonal is formed between (i) an intersection point of a line substantially orthogonal to the second plane and extended from the first position on the first plane, and (ii) the second position on the second plane, and
the first rectangular area and the second rectangular area serve as two opposing faces of the selection range.

20. The information processing apparatus according to claim 15, wherein, in the setting processing, the reference position is set as a position at which a straight line intersects the user, the straight line (i) passing through a midpoint between bases of the user's right and left thumbs, and (ii) being approximately perpendicular to two planes respectively specified by the user's right thumb and forefinger and by the user's left thumb and forefinger.

21. An information processing method for causing a computer to execute:
performing display control of a plurality of virtual objects such that the plurality of virtual objects are placed in a three-dimensional space that serves as a field of view of a user;

determining whether a selection mode for switching a state of any of the plurality of the virtual object between a selected state and a deselected state is started or not;

setting, in a case where the selection mode has been started, a selection range in the three-dimensional space based on a plurality of positions having different distances in a depth direction from the user, the plurality of positions being designated by using an operation body located at a position of a hand of the user; and among the plurality of the virtual objections, switching the state of the virtual object included in the selection range to the selected state and switching the state of the virtual object not included in the selection range to the deselected state, wherein the selection range has a frustum shape with the user's side as a top face, the top face of the selection range is included in a first plane defined based on a first position being designated by using the operation body, and a bottom face of the selection range is included in a second plane defined based on a second position which is further from the user in the depth direction than the first position.

22. A non-transitory computer-readable medium that stores a program for causing a computer to execute an information processing method comprising:

performing display control of a plurality of virtual objects such that the plurality of virtual objects are placed in a three-dimensional space that serves as a field of view of a user;

determining whether a selection mode for switching a state of any of the plurality of the virtual object between a selected state and a deselected state is started or not;

setting, in a case where the selection mode has been started, a selection range in the three-dimensional space based on a plurality of positions having different distances in a depth direction from the user, the plurality of positions being designated by using an operation body located at a position of a hand of the user; and among the plurality of the virtual objections, switching the state of the virtual object included in the selection range to the selected state and switching the state of the virtual object not included in the selection range to the deselected state, wherein the selection range has a frustum shape with the user's side as a top face, the top face of the selection range is included in a first plane defined based on a first position being designated by using the operation body, and a bottom face of the selection range is included in a second plane defined based on a second position which is further from the user in the depth direction than the first position.

* * * * *